(12) United States Patent
Takenaka (10) Patent No.: US 7,166,832 B2
(45) Date of Patent: Jan. 23, 2007

(54) SELF-RUNNING ROBOT

(75) Inventor: Hiroyuki Takenaka, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 5 days.

(21) Appl. No.: 11/176,643

(22) Filed: Jul. 7, 2005

(65) Prior Publication Data

US 2006/0006316 A1  Jan. 12, 2006

(30) Foreign Application Priority Data

Jul. 9, 2004 (JP) ............................. 2004-203657

(51) Int. Cl.
G05B 19/04 (2006.01)

(52) U.S. Cl. .................. 250/221; 901/47; 700/253; 700/259

(58) Field of Classification Search ................ 250/221, 250/222.1; 901/47; 700/253, 258, 259
See application file for complete search history.

(56) References Cited

U.S. PATENT DOCUMENTS

| | | | | |
|---|---|---|---|---|
| 6,507,773 B2 * | 1/2003 | Parker et al. | ................ | 700/258 |
| 6,711,469 B2 * | 3/2004 | Sakamoto et al. | .......... | 700/245 |
| 7,082,351 B2 * | 7/2006 | Hara et al. | ................. | 700/248 |
| 7,089,084 B2 * | 8/2006 | Ohta et al. | .................. | 700/245 |

FOREIGN PATENT DOCUMENTS

| | | |
|---|---|---|
| JP | 63-92486 | 6/1988 |
| JP | 6-98844 | 4/1994 |
| JP | 8-184494 | 7/1996 |
| JP | 11-282533 | 10/1999 |
| JP | 2001-186505 | 7/2001 |
| JP | 2002-350555 | 12/2002 |
| JP | 2003-051082 | 2/2003 |

OTHER PUBLICATIONS

Patent Abstracts of Japan, Publication No.: 06-098844, Publication Date: Apr. 12, 1994, 1 page.
Patent Abstracts of Japan, Publication No.: 11-282533, Publication Date: Oct. 15, 1999, 1 page.
Patent Abstracts of Japan, Publication No.: 2002-350555, Publication Date: Dec. 4, 2002, 1 page.

(Continued)

Primary Examiner—Thanh X. Luu
Assistant Examiner—Stephen Yam
(74) Attorney, Agent, or Firm—Osha Liang LLP (57) ABSTRACT

A self-running robot tracking and imaging a human body with an inexpensive arrangement includes: first to fourth sensors; a camera; a driving device moving the first to fourth sensors and camera simultaneously; a rotary encoder detecting that the first to fourth sensors and camera have stopped; a control unit which, upon detection of a heat source by one of the first to fourth sensors, controls the driving device such that the camera turns to the direction which the sensor detecting the heat source faced, and controls the camera so as to image an object after the camera has stopped, and controls the driving device such that the first to fourth sensors remain stationary for 3 seconds after the camera has stopped irrespective of whether a heat source is detected.

3 Claims, 7 Drawing Sheets

OTHER PUBLICATIONS

Notice of Ground of Rejection for Japanese Patent Application No. 203657/2004, and English translation thereof, 4 pages.

Partial mechanical English translation of Japanese Utility Model Laying-Open Gazette for Utility Model Laying-Open No. 63-092486, Published Jun. 15, 1988, 1 page.

English Patent Abstract of JP2003051082 from esp@cenet, published Feb. 21, 2003, 1 page.

English Patent Abstract of JP8184494 from esp@cenet, published Jul. 16, 1996, 1 page.

English Patent Abstract of JP2001186505 from esp@cenet, published Jul. 6, 2001, 1 page.

* cited by examiner

| SENSOR POSITION | FIRST SENSOR | SECOND SENSOR | THIRD SENSOR | FOURTH SENSOR | TURN DIRECTION |
|---|---|---|---|---|---|
| DETECT (O) AND NON-DETECT (×) | O | × | × | × | LEFT-FRONT |
| | × | O | × | × | LEFT-REAR |
| | × | × | O | × | RIGHT-FRONT |
| | × | × | × | O | RIGHT-REAR |
| | O | O | × | × | NONE (NO IMAGING): NO OPERATION |
| | O | × | O | × | LEFT |
| | O | × | × | O | NONE (WITH IMAGING) |
| | × | O | O | × | LEFT-FRONT |
| | × | O | × | O | RIGHT-FRONT |
| | × | × | O | O | REAR |
| | O | O | O | × | RIGHT |
| | O | O | × | O | LEFT-FRONT |
| | O | × | O | O | LEFT-REAR |
| | × | O | O | O | RIGHT-FRONT |
| | × | O | O | O | RIGHT-REAR |
| | O | O | O | O | NONE (WITH IMAGING) |

SELF-RUNNING ROBOT

BACKGROUND OF THE INVENTION

1. Field of the Invention

The present invention relates to a self-running robot, and particularly, to a self-running robot used to provide security.

2. Description of the Background Art

A conventional self-running robotic cleaner, such as that disclosed in Japanese Patent Laying-Open No. 06-098844 includes: a charge and power supply unit providing a direct voltage; a microprocessor that receives the direct voltage provided by the charge and power supply unit; a key input circuit that receives an action condition and an action command from a user to provide the action condition and the action command to the microprocessor; a thermal infrared radiation sensing circuit that senses thermal infrared radiation from a human body and a pet and provides a sense signal thereof to the microprocessor; a forward/backward movement motor driving circuit that receives a drive signal from the microprocessor to rotate a forward and backward motor thereby rotating a driving wheel either forward or backward; a steering motor driving circuit that receives a drive signal from the microprocessor to rotate a steering motor thereby changing the direction of advancement for the driving wheel; an ultrasonic wave transmission circuit that receives an ultrasonic wave signal from the microprocessor to transmit ultrasonic wave; an ultrasonic wave reception circuit that receives ultrasonic wave transmitted from the ultrasonic wave transmission circuit and reflected from an obstacle; and a cleaning motor driving circuit that receives a drive signal provided by the microprocessor based on a received signal to drive a cleaning motor to effect cleaning.

The above invention can reduce the production cost of a product and reduce the cleaning time, providing improved cleaning performance.

A conventional mobile robotic system, such as that disclosed in Japanese Patent Laying-Open No. 11-282533 includes a mobile robot that autonomously moves and performs tasks and a management device that directs the mobile robot to perform a task, the mobile robot including a control device that allows the robot to travel to the management device upon experiencing an external or internal influence, and an information transfer device that exchanges information with the management device.

According to the above invention, the mobile robot travels to the management device when a task of the mobile robot is to be interrupted or a task is to be started again from the beginning, facilitating the transfer of a direction by the management device to the mobile robot in the middle of a task. Moreover, information can also be transmitted from the mobile robot to the management device, thereby providing for the transfer to the management device of information on e.g. ambient situations including the presence of an obstacle obtained by the mobile robot, allowing the management device to issue corresponding directions or perform corresponding processes based on the information.

A conventional human detection arrangement, such as that disclosed in Japanese Patent Laying-Open No. 2002-350555 includes: a first sensor that senses the presence of a human within a first sensed area; and a second sensor that senses the presence of a human within a second sensed area smaller than the first sensed area, characterized in that the presence of a human within the first sensed area is sensed using the first sensor before sensing the presence of the human within the second sensed area using the second sensor to sense the direction of the human.

According to the above invention, the direction of the human can be determined in a simple manner.

Unfortunately, the inventions disclosed in Japanese Patent Laying-Open Nos. 06-098844 and 11-282533 do not provide easy tracking and sensing of the movement of a human body, since pyroelectric sensors are incapable of locating a human within the sensed areas.

The invention disclosed in Japanese Patent Laying-Open No. 2002-350555 requires higher manufacturing cost than is acceptable for a device merely for tracking and imaging a human body, since it fails to deal with noise generated during tracking and imaging of a human body.

SUMMARY OF THE INVENTION

The present invention attempts to solve the above problems. An object of the present invention, therefore, is to provide a self-running robot capable of tracking and imaging a human body with a simple arrangement.

To achieve the above object, a self-running robot according to an aspect of the present invention includes: a plurality of pyroelectric sensors detecting a heat source; a camera imaging an object on its optical axis; a driving device moving the plurality of pyroelectric sensors and camera simultaneously; a rotary encoder detecting that the plurality of pyroelectric sensors and camera have stopped; a first control device which, upon detection of the heat source by one of the plurality of pyroelectric sensors, controls the driving device such that the optical axis of the camera is in the direction which the pyroelectric sensor detecting the heat source faced; a second control device which controls the camera such that the camera images an object after the rotary encoder detects that the camera has stopped with its optical axis being in the direction which the pyroelectric sensor detecting the heat source faced; and a third control device which controls the driving device such that the plurality of pyroelectric sensors remain stationary for 3 seconds after the rotary encoder detects that the camera has stopped with its optical axis being in the direction which the pyroelectric sensor detecting the heat source faced, irrespective of whether the plurality of pyroelectric sensors detect a heat source.

Thus, just 3 seconds of standstill allows the camera to image an object using a simple arrangement while achieving accurate tracking by minimizing noise generated by the driving device moving the plurality of pyroelectric sensors simultaneously. Thus, a self-running robot may be provided capable of accurately tracking and imaging a human body using a simple arrangement.

A self-running robot according to another aspect of the present invention includes: a plurality of first detection sensors detecting a heat source; a camera imaging an object on its optical axis; a moving device moving the plurality of first detection sensors and camera simultaneously; a second detection sensor detecting that the plurality of first detection sensors and the camera have stopped; a first control device which, upon detection of the heat source by one of the plurality of first detection sensors, controls the moving device such that the optical axis of the camera is in the direction which that of the first detection sensors detecting the heat source faced; a second control device which controls the camera such that the camera images an object after the second detection sensor detects that the camera has stopped with its optical axis being in the direction which that of the first detection sensors detecting the heat source faced; and a third control device which controls the moving device such that the plurality of first detection sensors remain stationary for a predetermined time period after the second detection sensor detects that the camera has stopped with its optical axis being in the direction which that of the first detection sensors detecting the heat source faced, irrespective of whether the plurality of first detection sensors detect a heat source.

Thus, the camera can image an object with a simple arrangement while minimizing noise generated by the moving device moving the plurality of first detection sensors simultaneously. Thus, a self-running robot can be provided capable of tracking and imaging a human body with a simple arrangement.

It is desired that the plurality of first detection sensors include two or more sensors for detecting a heat source using the same construction. In addition, it is desired that the predetermined time period is not less than the time since the camera stops until the output of one of the two or more sensors is stabilized.

Thus, the camera can image an object with a simple arrangement while achieving accurate tracking by minimizing noise generated by the moving device moving the plurality of first detection sensors simultaneously. Thus, a self-running robot can be provided capable of accurately tracking and imaging a human object with a simple arrangement.

It is desired that the two or more sensors are pyroelectric sensors. In addition, it is desired that the time since the camera stops until the output of one of the two or more sensors is stabilized is 3 seconds.

That is, the two or more first detection sensors using the same construction are pyroelectric sensors. Thus, just 3 seconds of standstill allows the camera to image an object while achieving accurate tracking by minimizing noise generated by the moving device moving the plurality of first detection sensors simultaneously. Thus, a self-running robot can be provided capable of yet more accurately tracking and imaging a human body with a simple arrangement.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described below referring to the figures. In the description below, the like components are labeled with the like designations and have the like names and functions as well. Thus, a detailed description thereof will not repeated.

[First Embodiment]

A self-running robot according to a first embodiment of the present invention is described below.

Figure 1A:
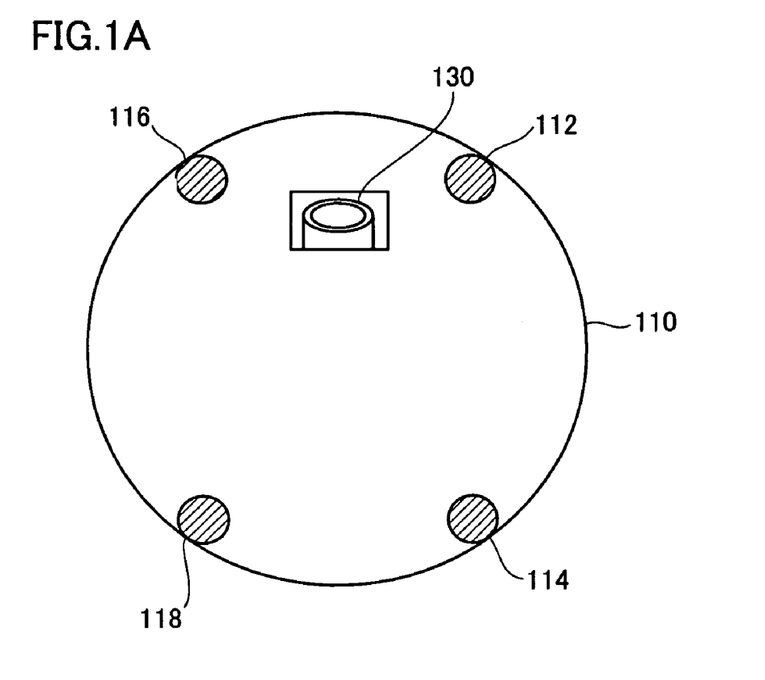
FIGS. 1A and 1B show the external appearance of a self-running robot according to a first embodiment of the present invention.
Figure 1B:
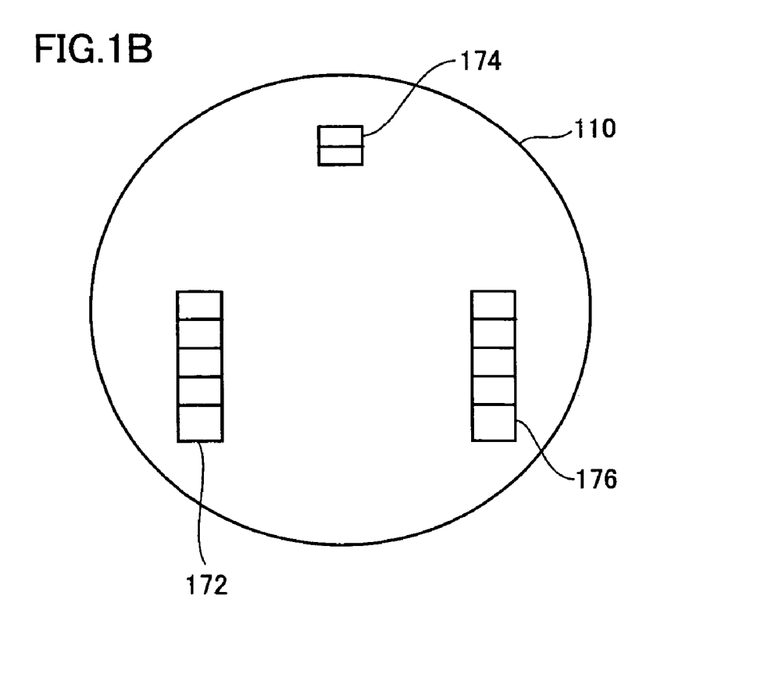
Figure 2:
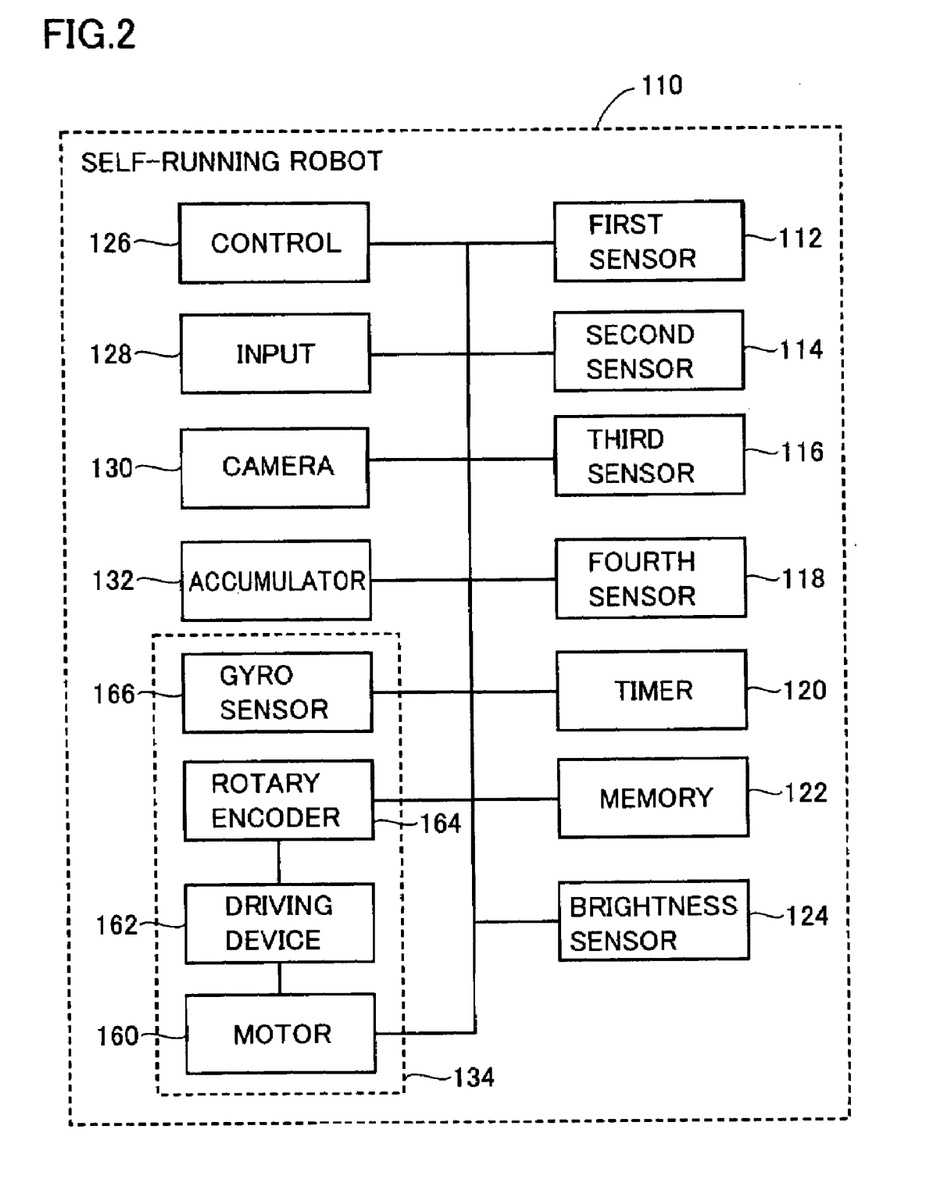
FIG. 2 is a control block diagram of the self-running robot according to the first embodiment of the present invention.

Referring to FIGS. 1A, 1B and 2, a self-running robot 110 according to the present embodiment includes a first sensor 112, a second sensor 114, a third sensor 116, a fourth sensor 118, a timer 120, a memory 122, a control unit 126, an input mechanism 128, a camera 130, an accumulator 132, and a running mechanism 134. FIGS. 1A and 1B show the external appearance of self-running robot 110 according to the present embodiment. Self-running robot 110 may be a disk-shaped robot that tracks and images an intruder in a user's home when the user is absent. FIG. 1A is a plan view and FIG. 1B is a bottom view of self-running robot 110. FIG. 2 is a control block diagram of self-running robot 110.

First to fourth sensors 112–118 may be pyroelectric sensors detecting the presence of a heat source (typically a human body) and outputting a signal. First sensor 112 is provided on the left-front edge of self-running robot 110; second sensor 114 is provided on the left-rear edge of self-running robot 110; third sensor 116 is provided on the right-front edge of self-running robot 110; and fourth sensor 118 is provided on the right-rear edge of self-running robot 110. Four sensors are provided since one sensor can detect a heat source in a range of 100 degrees with respect to the sensor. Timer 120 outputs a signal after the passage of a predetermined period. Memory 122 stores information needed for controlling various components of self-running robot 110. A brightness sensor 124 detects the brightness in the environment of self-running robot 110. Brightness sensor 124 provides control unit 126 with a signal indicating a value for the brightness in the environment. Control unit 126 controls various components of self-running robot 110. Control unit 126 also performs operations needed for the control. Input mechanism 128 accepts the user's operations by receiving a signal. Camera 130 images an object that is located on its optical axis. In the present embodiment, camera 130 employs a charge-coupled device (CCD). A filter is provided in front of the lens of camera 130. Camera 130 automatically mounts and removes the filter based on the value provided by brightness sensor 124, which allows camera 130 to function as a normal digital camera in bright environment and as an infrared camera in dark environment. Camera 130 is provided on the front of self-running robot 110. Accumulator 132 accumulates electric power. Running mechanism 134 generates a propelling power that enables self-running robot 110 to navigate.

Running mechanism 134 includes a motor 160, a driving device 162, a rotary encoder 164, and a gyro sensor 166. Motor 160 consumes electric power to rotate a rotor. Driving device 162 conveys the torque of the rotor to the surface of the floor, allowing self-running robot 110 to travel on the floor. Driving device 162 moves simultaneously first to fourth sensors 112–118 and camera 130. Rotary encoder 164 generates a pulse according to the rotation of driving device 162. Rotary encoder 164 of the present embodiment is an increment-based rotary encoder. The generated pulse is output to control device 126 to allow it to determine the speed for driving device 162 based on the presence of the pulse and the number of pulses per unit time. Thus, rotary encoder 164 detects when first to fourth sensors 112–118 and camera 130 stop. Gyro sensor 166 detects, independently from rotary encoder 164, whether driving device 162 is rotated, i.e. gyro sensor 166 detects when first to fourth sensors 112–118 and camera 130 stop similar to rotary encoder 164.

Driving device 162 includes a driving wheel (right) 172, a driven wheel 174 and a driving wheel (left) 176. Driving wheel (right) 172 and driving wheel (left) 176 constitute a crawler that receives motion from motor 160 to generate a propelling power. Driven wheel 174 follows the movement of right and left driving wheels 172 and 176. Driven wheel 174 is fixedly mounted to face a certain direction. Thus, driven wheel 174 slides on the floor as self-running robot 110 spins. To reduce the frictional resistance against the sliding on the floor, the edge of driven wheel 174 is rounded and is made of resin (in the present embodiment, the wheels are made of nylon, although urethane, for example, may also be used).

Figure 3:
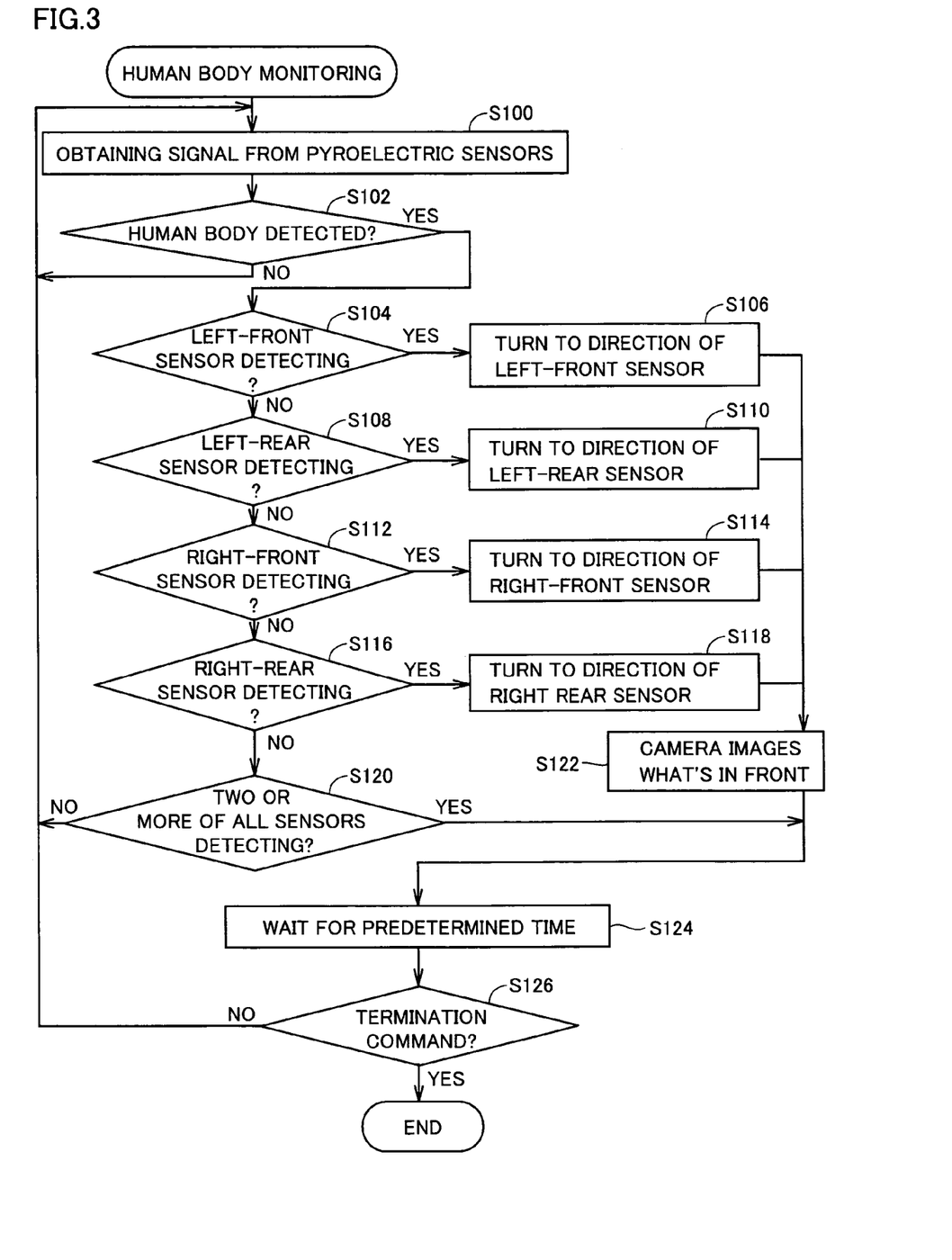
FIG. 3 is a flowchart illustrating a procedure for controlling the imaging process of the self-running robot according to the first embodiment of the present invention.

Referring to FIG. 3, a program executed on self-running robot 110 according to the present embodiment performs the following operations for imaging an intruder:

At step 100 (a step is hereinafter indicated by S), control unit 126 obtains a signal from first to fourth sensors 112–118.

At S102, control unit 126 determines if one of first to fourth sensors 112–118 has detected a human body. If so (YES at S102), the process moves to S104. Otherwise (NO at S102), the process returns to S100.

At S104, control unit 126 determines if only first sensor 112 has detected a human body. If so (YES at S104), the process moves to S106. Otherwise (NO at S104), the process moves to S108. At S106, motor 160 is rotated under the pulse-width modulation (PWM) control of control unit 126. The rotation of motor 160 causes driving wheel (right) 172 to generate a backward propelling power. Driving wheel (left) 176 generates a forward propelling power. Self-running robot 110 turns to the direction which first sensor 112 originally faced.

At S108, control unit 126 determines if only second sensor 114 has detected a human body. If so (YES at S108), the process moves to S110. Otherwise (NO at S108), the process moves to S112. At S110, motor 160 is rotated under the PWM control of control unit 126. The rotation of motor 160 causes driving wheel (right) 172 to generate a backward propelling power and driving wheel (left) 176 to generate a forward propelling power. Self-running robot 110 turns to the direction which second sensor 114 faced.

At S112, control unit 126 determines if only third sensor 116 has detected a human body. If so (YES at S112), the process moves to S114. Otherwise (NO at S112), the process moves to S116. At S114, motor 160 is rotated under the PWM control of control unit 126. The rotation of motor 160 causes driving wheel (right) 172 to generate a forward propelling power and driving wheel (left) 176 to generate a backward propelling power. Self-running robot 110 turns to the direction which third sensor 114 faced.

At S116, control unit 126 determines if only fourth sensor 118 has detected a human body. If so (YES at S116), the process moves to S118. Otherwise (NO at S116), the process moves to S120. At S118, motor 160 is rotated under the PWM control of control unit 126. The rotation of motor 160 causes driving wheel (right) 172 to generate a forward propelling power and driving wheel (left) 176 to generate a backward propelling power. Self-running robot 110 turns to the direction which fourth sensor 118 faced.

At S120, control unit 126 determines if two or more of first to fourth sensors 112–118 have detected a human body. If so (YES at S120), the process moves to S124. Otherwise (NO at S120), the process returns to S100.

At S122, control unit 126 outputs a signal after driving device 162 has stopped. Control unit 126 determines that driving unit 162 has stopped when one of the following two requirements is met. One requirement is that rotary encoder 164 no longer outputs a pulse. The other requirement is that rotary encoder 164 outputs an abnormal pulse and gyro sensor 166 detects the stopping of driving device 162. In determining if driving device 162 has stopped, the result from rotation encoder 164 is prioritized. When control unit 126 outputs the signal, camera 130 images an object located in front of it. Camera 130 provides data of the taken image to control unit 126, which stores the image data in memory 122. Thus, control unit 126 controls camera 130 such that camera 130 images an object after rotary encoder 164 or gyro sensor 166 has detected that camera 130 has stopped with its optical axis being in the direction which that of first to fourth sensors 112–118 detecting the heat source faced.

At S124, timer 120 outputs, after the passage of a predetermined time period, a signal to control unit 126 indicating the expiration of the time period. Control unit 126 suspends its operations until the signal is output. Thus, control unit 126 controls driving device 162 such that first to fourth sensors 112–118 remain stationary for a predetermined period after rotary encoder 164 or gyro sensor 166 detects that camera 130 has stopped with its optical axis in the direction which that of first to fourth sensors 112–118 detecting a heat source faced, irrespective of whether first to fourth sensors 112–118 detect a heat source. In the present embodiment, a "predetermined period" is 3 seconds, which value was derived from the fact that the optimal value obtained from experiments (i.e. the minimum time for one of first to fourth sensors 112–118 to be stabilized; a malfunction is often encountered directly after a movement of first to fourth sensors 112–118 due to heat fluctuation) was 3 seconds.

At S126, control unit 126 determines if input mechanism 128 received a signal indicating that monitoring should be terminated. If so (YES at S126), the process ends. Otherwise (NO at S126), the process moves back to S100.

Now, operations of self-running robot 110 of a structure as described above based on the above flowchart will be described.

Self-running robot 110 is in a halt state when it begins the monitoring of an intruder. Control unit 126 obtains a signal from first to fourth sensors 112–118 (S100). Upon obtaining the signal, control unit 126 determines if one of first to fourth sensors 112–118 has detected a human body (S102). Assume that only first sensor 112, located at the left-front, has detected a human body. Since control unit 126 determines that one of first to fourth sensors 112–118 has detected a human body (YES at S102), control unit 126 then determines if only first sensor 112 has detected a human body (S104). In this example, it is determined that only first sensor 112 has detected a human body (YES at S104), such that motor 160 is rotated under the PWM control of control unit 126. Thus, upon detection of a heat source by one of first to fourth sensors 112–118, control unit 126 controls driving device 162 such that the optical axis of camera 130 is in the direction which the sensor detecting the heat source faced. Driving device 162 of self-running robot 110 causes the robot to spin to the direction which first sensor 112 faced (to the left as viewed upon the front of self-running robot 110) (S106). Once driving device 162 is rotated and halted and control unit 126 outputs a signal, camera 130 images an object in front of it (S122). Once the object is imaged, timer 120 outputs, after the passage of a predetermined time period, a signal to control unit 126 indicating the expiration of the time period (S124), which causes self-running robot 110 to remain stationary for the predetermined period after the spinning using driving device 162. The robot should remain stationary because a moving pyroelectric sensor might detect a fluctuation of ambient heat and erroneously outputs a signal indicating the presence of a heat source, even when there is no heat source nearby. Once a signal is output indicating the expiration of the time period, control unit 126 determines if input mechanism 128 has received a signal indicating that monitoring should be terminated (S126). If not (NO at S126), the process from S100 to S126 is repeated until a signal is received indicating the termination of monitoring.

Thus, self-running robot 110 according to the present embodiment includes a plurality of pyroelectric sensors mounted on it and waits in a halt state for a detection of a human body. If one of the sensors detects a human body (or it may detect an animal other than human; such applies to the following and to the second embodiment), the robot automatically turns to the direction which that sensor faced, and images the human body. When it is to continue to turn, it waits for a while and then tries to detect a human body again. Thus, a self-running robot can be provided capable of tracking and imaging a human body with an inexpensive arrangement.

It should be noted that first to fourth sensors 112–118 may be provided on the sides of self-running robot 110.

Further, first to fourth sensors 112–118 may be other sensors than pyroelectric sensors. In this case, the "predetermined period" in S124 may be any time period that is equal to or longer than the time from the completion of a movement of first to fourth sensors 112–118 to the stabilization of the output of all of first to fourth sensors 112–118.

Also, at S124, timer 120 may output a signal to control unit 126 indicating the expiration of the time period after camera 130 has stopped and the output of one of first to fourth sensors 112–118 has been stabilized. The applicability of such requirement is derived from the fact that first to fourth sensors 112–118 are located such that two or less sensors can detect a heat source located at one point and three or more sensors are provided. Typically, there is only one intruder encountered. If only one intruder is detected by two or less sensors, there is at least one sensor that cannot detect the presence of the intruder. This sensor's output is not affected by heat generated by the intruder, and generally originates from heat fluctuation. These considerations mean the following: firstly, when one sensor's output is stabilized, it can be estimated that another sensor's output is also stabilized; secondly, when one sensor's output is stabilized and, at the same moment, another sensor's output is not stabilized, such instability is due to the presence of a heat source (i.e. intruder). Thus, an attempt to detect a heat source can be initiated directly after the output of one of first to fourth sensors 112–118 has reached a constant value in order to prevent a malfunction and allow quick detection of the presence of an intruder.

[Second Embodiment]

A self-running robot according to a second embodiment of the present invention will be described below.

Self-running robot 110 according to the present embodiment has the same hardware configuration as the first embodiment described above and has the same functions as well. Accordingly, a detailed description thereof will not be repeated.

Figure 4:
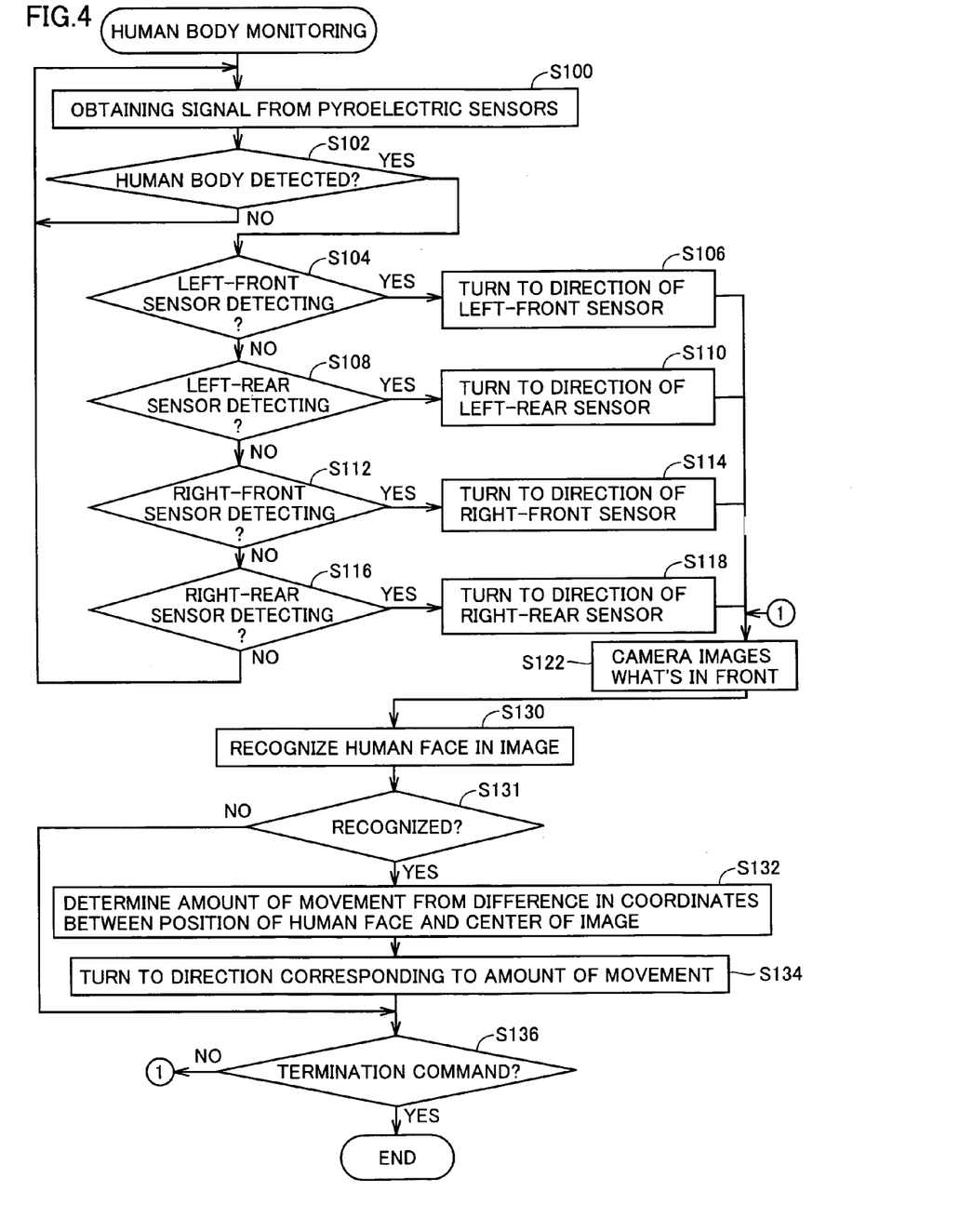
FIG. 4 is a flowchart illustrating a procedure for controlling the imaging process of a self-running robot according to a second embodiment of the present invention.

Referring to FIG. 4, a program executed on self-running robot 110 according to the present embodiment performs the following operations for imaging an intruder. Note that in the flowchart shown in FIG. 4, those operations that have been discussed above referring to FIG. 3 are labeled with the same step numbers and are the identical operations. Accordingly, a detailed description thereof will not be repeated.

At S130, control unit 126 recognizes a human face in the image taken by camera 130. In the present embodiment, those of the pixels are extracted having a difference in tone from the surrounding pixels larger than a threshold (arbitrarily given by the designer of self-running robot 110) and a template matching is executed between the arrangement of such pixels and ellipses, and it is determined that a human face is imaged when the degree of matching is above a threshold (again arbitrarily given by the designer of self-running robot 110), where the center of the face is considered to be at the center coordinates of a template with a degree of matching above the threshold. In the present embodiment, image recognition is executed using different template ellipse sizes.

At S131, control unit 126 determines if it recognized a human face. If so (YES at S131), the process moves to S132. Otherwise (NO at S131), the process moves to S136. At S132, control unit 126 calculates the difference in coordinates between the center of the human face in the image and the center of the entire image.

At S134, control unit 126 controls motor 160 such that the center of the human face in the image lies on the vertical centerline of the entire image. Motor 160 causes the robot to spin under the control of control unit 126. Prior to this, the distance from the intruder needs to be measured to calculate the angle $\phi$ at which the robot should turn, a method of which will be described below.

At S136, control unit 126 determines if input mechanism 128 has received a signal indicating that monitoring should be terminated. If so (YES at S136), the process ends. Otherwise (NO at S136), the process returns to S122.

Operations of self-running robot 110 of a structure as described above based on the above flowchart will be described below.

After the operations in S100–118, control unit 126 recognizes a human face in the image taken by camera 130 (S130). If control unit 126 recognizes a human face, it calculates the difference in coordinates between the center of the human face in the image and the center of the entire image (S132). Once the difference in coordinates is found, control unit 126 controls motor 160 such that the center of the human face in the image lies on the vertical centerline of the entire image. Motor 160 causes the robot to spin under the control of control unit 126 (S134). For this purpose, control unit 126 uses the following procedure to measure the distance from the intruder and calculates the needed amount of movement (the angle $\phi$ at which self-running robot 110 should turn).

A first step is to calculate the difference in coordinates (in this case, the difference in the horizontal coordinate C) between the position of the center of the human face in the most recently taken image (first image) and the position of the center of the human face in an image taken directly before the first image was taken (second image).

A second step involves substituting the angle $\theta$ at which self-running robot 110 turned directly before the first image was taken (which angle is stored in memory 122) into the following equation to calculate the distance R between the intruder and self-running robot 110 at the moment when the second image was taken:

$$0.5C = R \sin(0.5\theta) \quad (1)$$

In the second step, the distance R calculated after the second image was taken (this distance R is referred to as "R (2)") and the distance R calculated for the first image (this distance R is referred to as "R (1)") are used to calculate the estimated distance R (0) between the intruder and self-running robot 110 at the moment of a next imaging.

A third step involves substituting the difference in the horizontal coordinate, S, calculated at S132 and the estimate R (0) into the following equation to calculate the angle φ at which self-running robot 110 is to turn:

$$0.5S = R(0)\sin(0.5\phi) \quad (2)$$

A fourth step is to store in memory 122 the center coordinates of the human face in the first image, distance R (1) and angle φ to be used to subsequently calculate an angle φ, for example. If the angle φ is to be calculated first, the first and second steps are not performed. Instead, at the third step, a value pre-stored as initial value in memory 122 is used as the estimate R (0) which is substituted into equation (2) to calculate the angle φ.

Once the angle φ was calculated, control unit 126 determines if input mechanism 128 has received a signal indicating that monitoring should be terminated. If not (NO at S136), the operations in S122–136 are repeated until control unit 126 determines that a signal has been received indicating the termination of monitoring.

Thus, a self-running robot according to the present embodiment includes a plurality of pyroelectric sensors mounted thereon and waits in a halt state for a detection of a human body. When one of the sensors detects a human body, the robot automatically rotates to the direction which that sensor faced and images the human body. Further, image recognition allows the recognition, tracking and imaging of an intruder. Thus, a self-running robot can be provided capable of tracking and imaging a human body with an inexpensive arrangement.

[Third Embodiment]

A self-running robot according to a third embodiment of the present invention will be described below.

Figure 5:
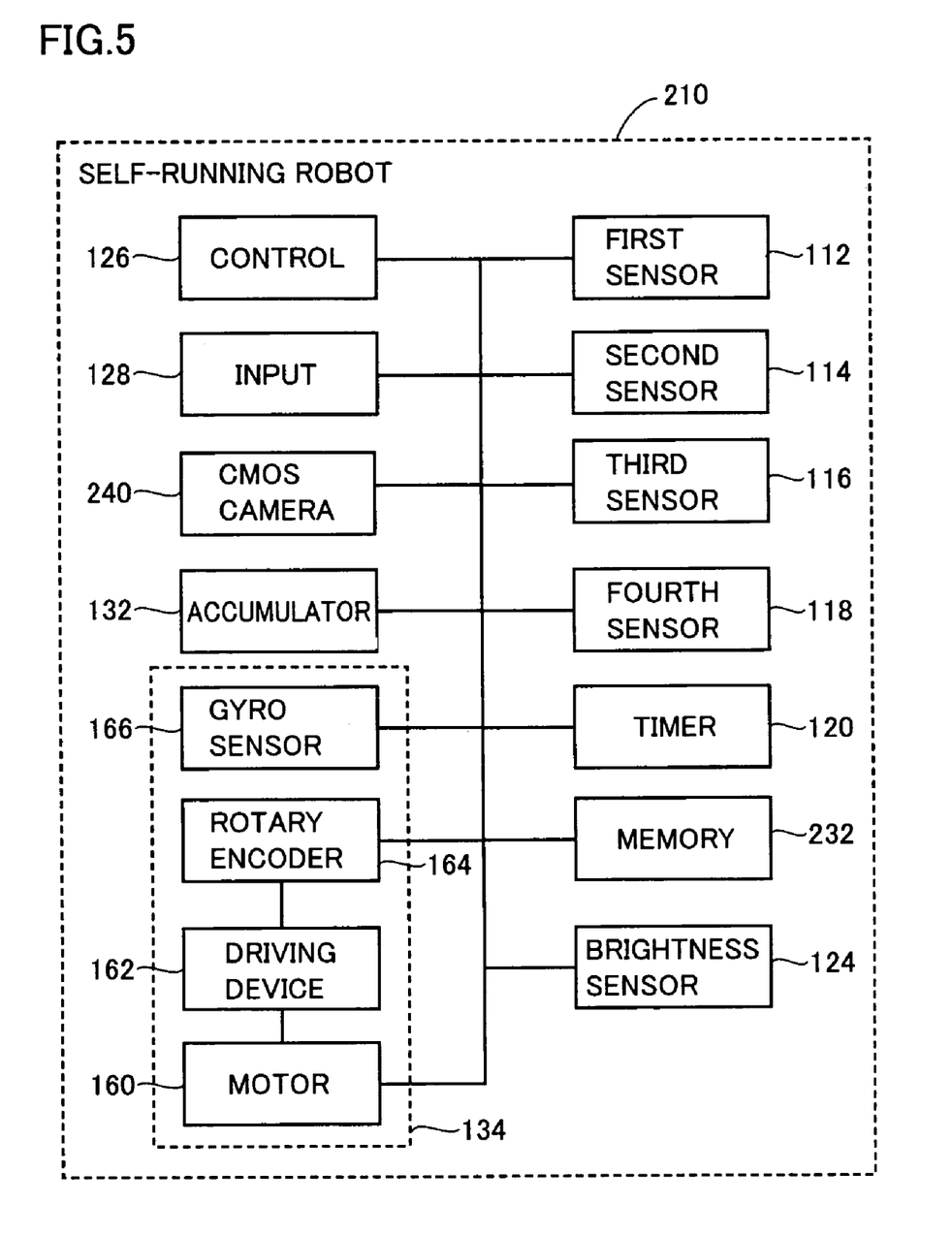
FIG. 5 is a control block diagram of a self-running robot according to a third embodiment of the present invention.

Referring to FIG. 5, a self-running robot 210 according to the present embodiment includes a first sensor 112, a second sensor 114, a third sensor 116, a fourth sensor 118, a timer 120, a memory 232, a control unit 126, an input mechanism 128, a complementary metal-oxide-semiconductor (CMOS) camera 240, an accumulator 132, and a running mechanism 134.

Figure 6:
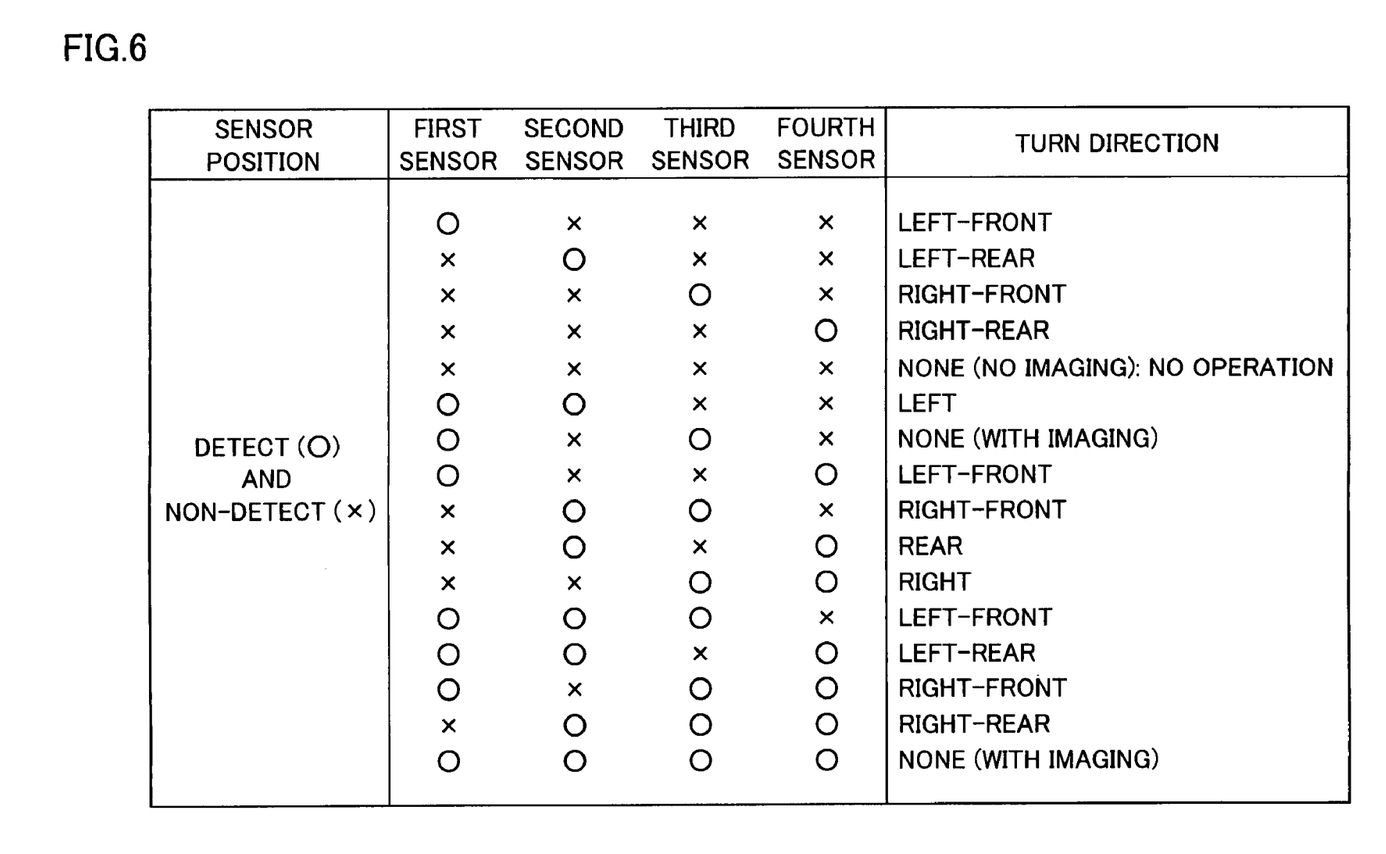
FIG. 6 illustrates data content stored in a memory according to the third embodiment of the present invention.

Memory 232 stores similar information to that stored in memory 122 of the first embodiment and, in addition, a data table indicating directions to which self-running robot 210 is to turn (hereinafter referred to as "data table"). The directions shown in FIG. 6 are those as viewed by a person opposite the front side of self-running robot 210. Referring to FIG. 6, the data table contains data indicating different combinations of detection and non-detection of a human body by the sensors and data indicating the directions to which self-running robot 210 is to turn. In the data table, the various combinations of detection and non-detection of a human body by the sensors are associated with the respective directions to which self-running robot 210 is to turn.

CMOS camera 240 images an object on its optical axis. CMOS camera 240 uses a CMOS device. A filter is provided in front of the lens of CMOS camera 240. CMOS camera 240 automatically mounts and replaces the filter based on the value provided by brightness sensor 124, which allows CMOS camera 240 to function as a normal digital camera in bright environment and as an infrared camera in dark environment. CMOS camera 240 is provided on the front of self-running robot 110.

Other hardware components are the same as in the first embodiment described above and their functions are the same, as well. Accordingly, a detailed description thereof will not be repeated.

Figure 7:
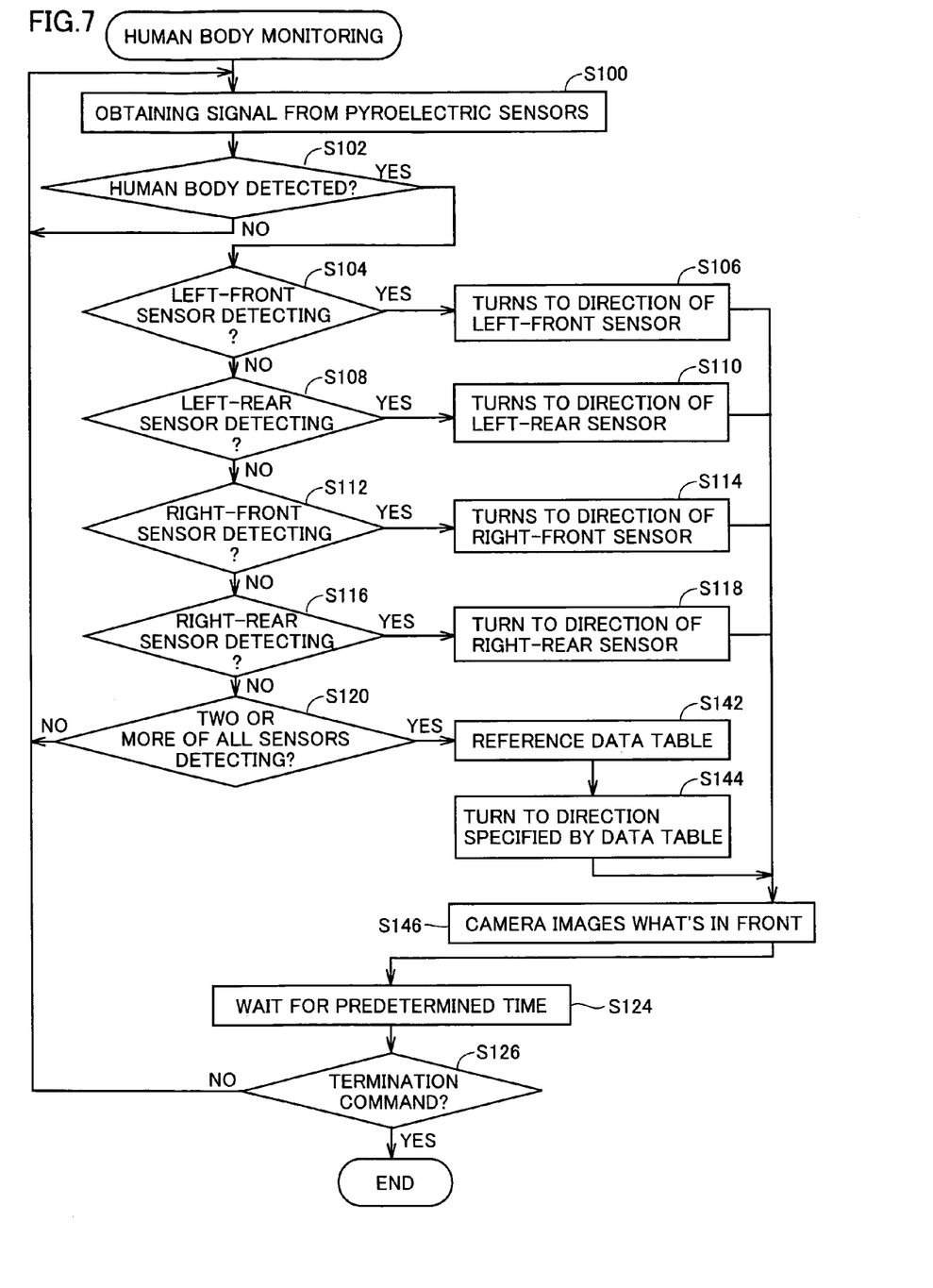
FIG. 7 is a flowchart illustrating a procedure for controlling the imaging process of the self-running robot according to the third embodiment of the present invention.

Referring to FIG. 7, a program executed on self-running robot 210 performs the following operations for imaging an intruder. In the flowchart shown in FIG. 7, those operations that have been discussed above referring to FIG. 3 are labeled with the same step numbers and are the identical operations. Accordingly, a detailed description thereof will not be repeated.

At S142, control unit 126 references the data table stored in memory 232 to specify the direction to which self-running robot 210 should turn.

At S144, motor 160 is rotated under the PWM control of control unit 126. The rotation of motor 160 causes right and left driving wheels 172 and 176 to rotate such that self-running robot 210 turns to the direction specified at S142.

At S146, control unit 126 outputs a signal after driving device 162 has stopped. Control unit 126 determines that driving device 162 has stopped when one of the following two requirements is met. One requirement is that rotary encoder 164 no longer outputs a pulse; the other requirement is that rotary encoder 164 outputs an abnormal pulse and gyro sensor 166 detects the stopping of driving device 162. In determining if driving device 162 has stopped, the result from rotary encoder 164 is prioritized. When control unit 126 outputs the signal, CMOS camera 240 images an object located in front of it. CMOS camera 240 provides data of the taken image to control unit 126 which stores the image data in a memory 232. Thus, control unit 126 controls CMOS camera 240 such that CMOS camera 240 images an object after rotary encoder 164 or gyro sensor 166 detects that CMOS camera 240 has stopped with its optical axis in the direction which that of first to fourth sensors 112–118 detecting a heat source faced.

Operations of self-running robot 110 of a structure described above based on the above flowchart will be described below.

After the operations in S100–116, control unit 126 determines if two or more of first to fourth sensors 112–118 have detected a human body (S120). If so (YES at S120), control unit 126 references the data table stored in memory 232 to specify the direction to which self-running robot 210 should turn (S142). Once the turn direction for self-running robot 210 was specified, right and left driving wheels 172 and 176 are rotated such that self-running robot 210 turns to the direction specified at S142 (S144). Once self-running robot 210 has turned, control unit 126 outputs a signal after driving unit 162 has stopped. When control unit 126 outputs the signal, CMOS camera 240 images an object in front of it (S146).

Thus, a self-running robot according to the present embodiment includes a plurality of pyroelectric sensors mounted thereon and waits in a halt state for a detection of a human body. When one of the sensors detects a human body (or an animal other than human), the robot references a data table to automatically turn to a predetermined direction for imaging the human body. If it is to continue to turn, it waits for a while and then tries to detect a human body again. Thus, a self-running robot can be provided capable of tracking and imaging a human body with an inexpensive arrangement.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A self-running robot comprising:
   a plurality of first detection sensors detecting a heat source;
   a camera imaging an object on its optical axis;
   a moving device moving said plurality of first detection sensors and camera simultaneously;
   a second detection sensor detecting that said plurality of first detection sensors and camera have stopped;
   a first control device which, upon detection of said heat source by one of said plurality of first detection sensors, controls said moving device such that the optical axis of said camera is in the direction which that of the first detection sensors detecting said heat source faced;
   a second control device which controls said camera such that said camera images an object after said second detection sensor detects that said camera has stopped with its optical axis being in the direction which that of the first detection sensors detecting said heat source faced; and
   a third control device which controls said moving device such that said plurality of first detection sensors remain stationary for a predetermined time period after said second detection sensor detects that said camera has stopped with its optical axis being in the direction which that of the first detection sensors detecting said heat source faced.

2. The self-running robot of claim 1, wherein said plurality of first detection sensors include two or more sensors for detecting a heat source using the same construction, and said predetermined time period is not less than the time since said camera stops until an output of one of said two or more sensors is stabilized.

3. The self-running robot of claim 2, wherein said two or more sensors are pyroelectric sensors, and the time since said camera stops until the output of one of said two or more sensors is stabilized is 3 seconds.

* * * * *